(12) United States Patent
Suzuki

(10) Patent No.: US 8,115,834 B2
(45) Date of Patent: Feb. 14, 2012

(54) IMAGE PROCESSING DEVICE, IMAGE PROCESSING PROGRAM AND IMAGE PROCESSING METHOD

(75) Inventor: Hiroshi Suzuki, Hachioji (JP)

(73) Assignee: Olympus Corporation, Tokyo (JP)

( * ) Notice: Subject to any disclaimer, the term of this patent is extended or adjusted under 35 U.S.C. 154(b) by 359 days.

(21) Appl. No.: 12/427,907

(22) Filed: Apr. 22, 2009

(65) Prior Publication Data

US 2009/0262222 A1    Oct. 22, 2009

Related U.S. Application Data

(63) Continuation of application No. PCT/JP2007/067673, filed on Sep. 11, 2007.

(30) Foreign Application Priority Data

Oct. 23, 2006    (JP) .................................. 2006-288097

(51) Int. Cl.
*H04N 5/217*    (2011.01)
*H04N 9/64*    (2006.01)
*G06K 9/00*    (2006.01)
*G06K 9/40*    (2006.01)

(52) U.S. Cl. ........ 348/241; 348/242; 382/167; 382/274; 382/275

(58) Field of Classification Search ................. 348/241, 348/242; 382/162–167, 254, 274, 275
See application file for complete search history.

(56) References Cited

FOREIGN PATENT DOCUMENTS

| | | |
|---|---|---|
| JP | 08-079550 A | 3/1996 |
| JP | 09-027915 A | 1/1997 |
| JP | 2004-072422 A | 3/2004 |
| JP | 2004-266323 A | 9/2004 |

*Primary Examiner* — Sinh Tran
*Assistant Examiner* — Mark Monk
(74) *Attorney, Agent, or Firm* — Holtz, Holtz, Goodman & Chick, PC

(57) ABSTRACT

An image processing device for performing color conversion processing on a VS (video signal obtained from a color CCD) includes a region defining section, which estimates an amount of noise of the VS, according to an ISO-sensitivity and a white-balance-coefficient, and, based on the estimated amount of noise, defines an AR (achromatic region) of a color space to which the video signal belongs as a region centered on an achromatic axis where saturation is 0, and a color conversion section, which determines whether or not the VS belongs to the AR, and does not perform color conversion processing or performs projection of the video signal onto the achromatic axis if the video signal does not belong to the AR, or performs color conversion processing so that the numerical error between a target color signal and a color signal after color conversion processing is minimized if the video signal belongs to the AR.

20 Claims, 11 Drawing Sheets

FIG.2
| R | G | R | G | R |
|---|---|---|---|---|
| G | B | G | B | G |
| R | G | R | G | R |
| G | B | G | B | G |
| R | G | R | G | R |
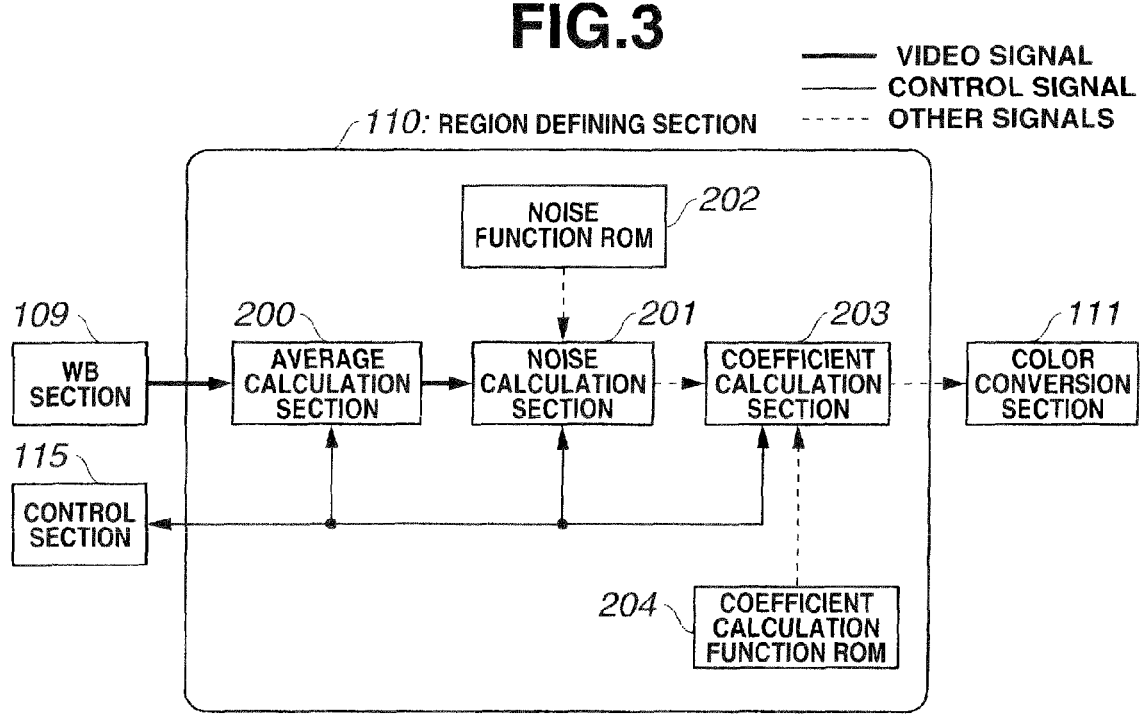
FIG.3
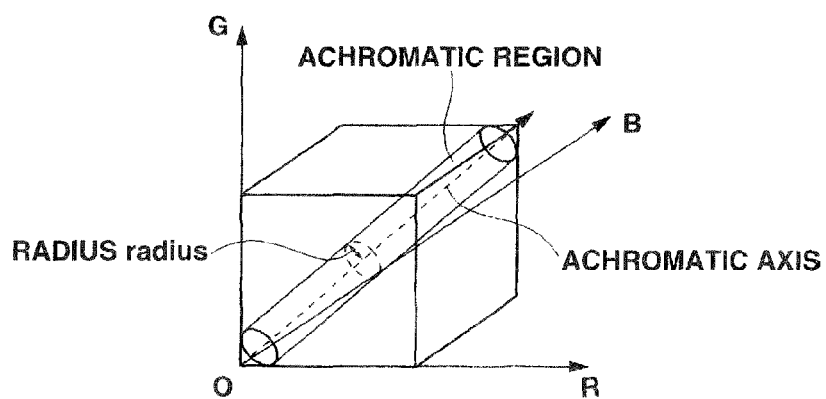
FIG.4

IMAGE PROCESSING DEVICE, IMAGE PROCESSING PROGRAM AND IMAGE PROCESSING METHOD

CROSS REFERENCE TO RELATED APPLICATION

This application is a continuation application of PCT/JP2007/067673 filed on Sep. 11, 2007 and claims benefit of Japanese Application No. 2006-288097 filed in Japan on Oct. 23, 2006, the entire contents of which are incorporated herein by this reference.

BACKGROUND OF INVENTION

1. Field of the Invention

The present invention relates to an image processing device, an image processing program and an image processing method for performing color conversion on video signals.

2. Description of the Related Art

An image pickup device, which has a color filter for primary colors or complementary colors on the front face, is used for many of image pickup systems in currently manufactured digital cameras, video cameras and the like. Video signals acquired from the image pickup device are subjected to several processings such as color conversion processing, gradation correction processing and edge enhancement processing, and then outputted as a final image.

Meanwhile, several types of color filters, each of which has a different spectral characteristic, are used for image pickup systems, and additionally, image pickup devices themselves have different spectral characteristics for each model. Accordingly, when more than one image pickup system having a different characteristic of color is used, each of the image pickup systems may output a final image having different color reproduction with one another even if the image pickup systems have an identical circuit to handle video signals.

As a technique to solve such a problem, a technique of a color management system (hereinafter referred to as CMS) has been proposed and adoption of the technique is necessary. In the CMS, color conversion processing using a matrix operation or an LUT is usually performed to match color signals. When the color conversion processing is performed using an LUT, there is the advantage of achieving high-precision processing, but large memory capacity is needed, thus resulting in enlargement of hardware scale.

On the other hand, when the color conversion processing is performed using a matrix operation, there is the advantage that memory capacity can be substantially reduced, thus resulting in reducing the hardware scale even though the precision of color conversion is somewhat inferior to that of the LUT.

Thus, as a practical approach, color conversion processing using a matrix has been widely utilized on product development.

However, the technique using the CMS described above may not achieve favorable color reproduction in a low color region, in particular. For example, the color conversion of the CMS using a matrix operation blends every color evenly. This allows each chromatic color to favorably reproduce their colors evenly, that is, precision in color conversion processing on the chromatic colors is kept. However, with such a technique, the signal of a color that should be originally achromatic is sometimes converted into a chromatic color signal, thus precision in the color reproduction on the achromatic region may be sacrificed.

Since a human visual characteristic is more sensitive to noise in the achromatic region than in the chromatic region, matrix conversion using a large coefficient has the adverse effect of increasing noise, which is not desired.

In order to solve such problems with the CMS, a technique for performing specific color conversion processing on the achromatic region has been proposed.

For example, Japanese Patent Application Laid-Open Publication No. 8-79550 discloses a technique, which determines whether or not input image data belongs to an achromatic neighboring range, and performs, on the image data determined to belong to the achromatic neighboring range, color adjustment appropriate to the achromatic neighboring range, or performs, on the image data determined to belong to a region other than the achromatic neighboring range, color adjustment to achieve an appropriate common chromatic color.

Further, Japanese Patent Application Laid-Open Publication No. 9-27915 discloses a technique, which determines whether or not a color prior to color conversion is achromatic, and removes chromatic components after color conversion if the color is determined to be achromatic, or uses the result of a matrix-based color conversion processing if the color is determined to be not achromatic.

As described above, the techniques described in Japanese Patent Application Laid-Open Publications No. 8-79550 and No. 9-27915 perform independent and appropriate color conversion processing on an achromatic color and a chromatic color, respectively, so as to perform high-precision color conversion processing on both the achromatic color and chromatic color.

Meanwhile, Japanese Patent Application Laid-Open Publications No. 2004-72422 and No. 2004-266323 describe a technique for estimating the amount of noise included in a video signal.

An object of the present invention is to provide an image processing device, an image processing program and an image processing method capable of performing high-quality and high-precision color conversion processing according to whether or not a video signal belongs to an achromatic region.

SUMMARY OF THE INVENTION

An image processing device according to the present invention, which performs color conversion processing on a video signal, includes noise amount estimation means for estimating an amount of noise of the video signal, region defining means for defining an achromatic region regarding a color space to which the video signal belongs based on the amount of noise estimated by the noise amount estimation means, determination means for determining whether or not the video signal belongs to the achromatic region defined by the region defining means, and color conversion means for performing color conversion processing on the video signal according to a determination result by the determination means.

An image processing program according to the present invention, which causes a computer to perform color conversion processing on a video signal, causes the computer to perform a noise amount estimation step of estimating an amount of noise of the video signal, a region defining step of defining an achromatic region regarding a color space to which the video signal belongs based on the amount of noise estimated in the noise amount estimation step, a determination step of determining whether or not the video signal belongs to the achromatic region defined by the region defining step, and a color conversion step of performing color conversion processing on the video signal according to a determination result by the determination step.

An image processing method according to the present invention, which performs color conversion processing on a video signal, includes a noise amount estimation step of estimating an amount of noise of the video signal, a region defining step of defining an achromatic region regarding a color space to which the video signal belongs based on the amount of noise estimated in the noise amount estimation step, a determination step of determining whether or not the video signal belongs to the achromatic region defined by the region defining step, and a color conversion step of performing color conversion processing on the video signal according to a determination result by the determination step.

BRIEF DESCRIPTION OF THE DRAWINGS

FIG. 2 is a diagram illustrating the configuration of a bayer type primary color filter according to the embodiment 1;

FIG. 3 is a block diagram illustrating an example of the configuration of a region defining section according to the embodiment 1;

FIG. 4 is a diagram illustrating an example of an achromatic region set in an RGB color space according to the embodiment 1;

DETAILED DESCRIPTION OF THE PREFERRED EMBODIMENT(S)

Embodiments of the present invention will now be described with reference to the drawings.

Embodiment 1

Figure 1:
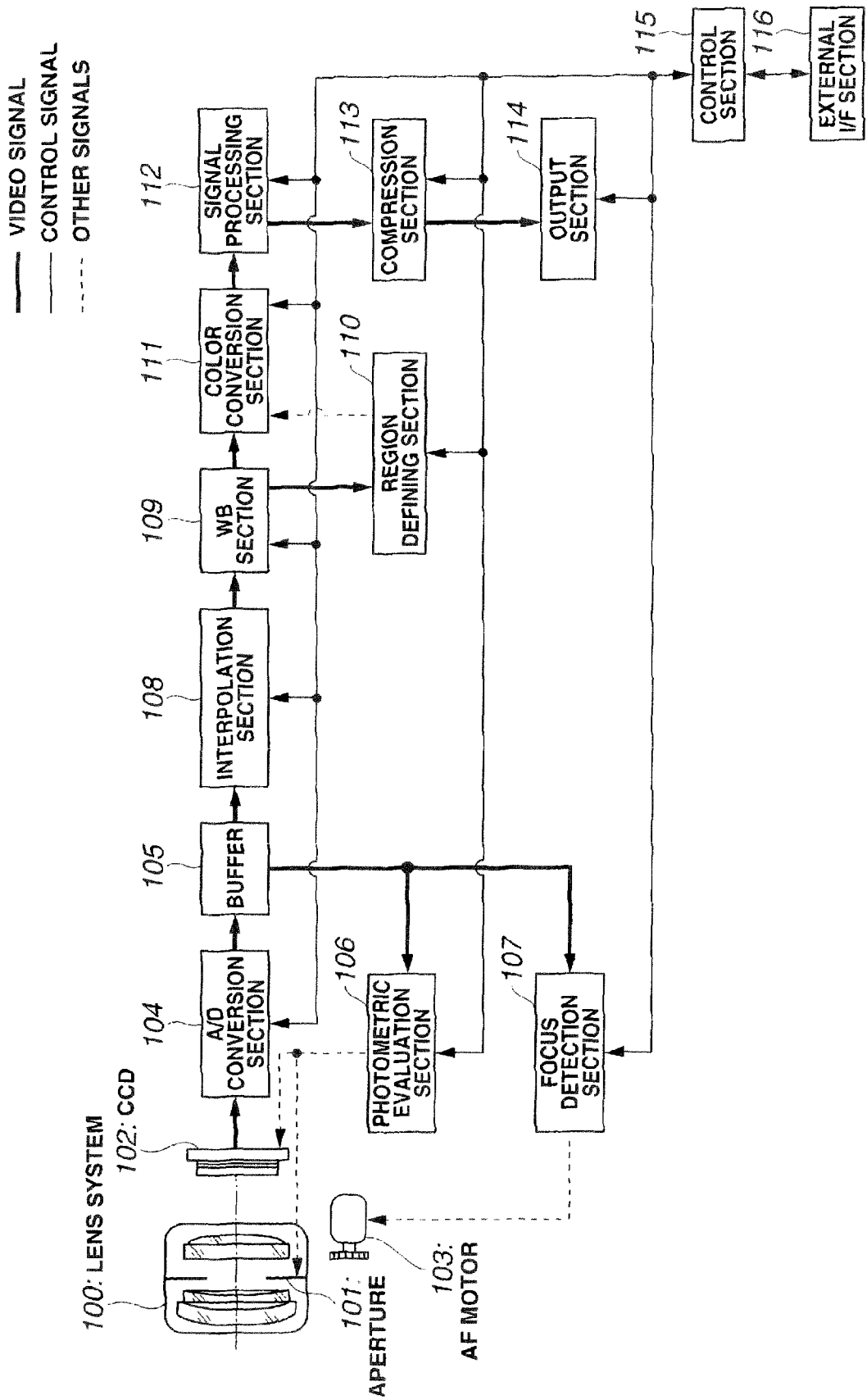
FIG. 1 is a block diagram illustrating the configuration of an image processing device according to an embodiment 1 of the present invention.

FIGS. 1 to 10 illustrate an embodiment 1 of the present invention, and FIG. 1 is a block diagram illustrating the configuration of an image processing device.

As shown in FIG. 1, the image processing device includes a lens system 100, an aperture 101, a CCD 102, an AF motor 103, an A/D conversion section 104, a buffer 105, a photometric evaluation section 106, a focus detection section 107, an interpolation section 108, a WB section 109, a region defining section 110, a color conversion section 111, a signal processing section 112, a compression section 113, an output section 114, a control section 115, and an external I/F section 116. Namely, the image processing device of the present embodiment is constituted as an image pickup apparatus including image pickup sections such as the lens system 100, the aperture 101, the CCD 102, the AF motor 103, the A/D conversion section 104, the photometric evaluation section 106 and the focus detection section 107.

An analog video signal obtained by photographing and outputted through the lens system 100, the aperture 101 and the CCD 102 is converted by the A/D conversion section 104 into a digital video signal.

The video signal from the A/D conversion section 104 is transferred to the photometric evaluation section 106, the focus detection section 107, and the interpolation section 108 through the buffer 105.

The photometric evaluation section 106 is connected to the aperture 101 and the CCD 102. Further, the focus detection section 107 is connected to the AF motor 103.

The interpolation section 108 is connected to the WB section 109. The WB section 109 is connected to the region defining section 110 and the color conversion section 111. The region defining section 110 is connected to the color conversion section 111.

The color conversion section 111 is connected to the signal processing section 112. The signal processing section 112 is connected to the compression section 113. The compression section 113 is connected to the output section 114.

The control section 115 is constituted by a microcomputer, for example, and is bidirectionally connected to and controls the A/D conversion section 104 the photometric evaluation section 106, the focus detection section 107, the interpolation section 108, the WB section 109, the region defining section 110, the color conversion section 111, the signal processing section 112, the compression section 113, and the output section 114.

The external I/F section 116 is also bidirectionally connected to the control section 115. The external I/F section 116 is an interface having a power source switch, a shutter button, a mode button for switching among various types of modes at the time of photographing.

Actions of the image processing device shown in FIG. 1 will now be described along the flow of a video signal.

Before photographing, a user sets photographing conditions such as an ISO sensitivity and a shutter speed through the external I/F section 116.

Then, when the user presses halfway the shutter button having a two-step switch on the external I/F section 116, the image processing device serving as an image pickup apparatus enters into a pre-photographing mode.

The lens system 100 forms an optical image of a subject on an image pickup surface of the CCD 102.

By defining a transmission range for the light flux from a subject whose image is formed by the lens system 100, the aperture 101 changes the brightness of the optical image formed on the image pickup surface of the CCD 102.

The CCD 102, which is formed as a color image pickup device, photoelectrically converts and outputs the formed optical image as an analog color video signal.

Note that in the present embodiment, it is assumed that, as the CCD 102, a single-plate CCD having a bayer type primary color filter on the front face is used.

FIG. 2 is a diagram illustrating the configuration of the bayer type primary color filter.

The bayer type primary color filter has 2×2 pixels as a basic unit, and within the basic unit, one each of a red (R) filter and a blue (B) filter is disposed at pixel positions on opposing corners, and green (G) filters are disposed at pixel positions on the remaining opposing corners.

The CCD 102 is used as a color image pickup device herein, but without being limited thereto, a CMOS and other color image pickup devices may be used.

The analog video signal outputted from the CCD 102 in this manner is converted into a digital video signal by the A/D conversion section 104, and transferred to the buffer 105. In the present embodiment, the gradation width of the digitized video signal is 12-bit, for example.

The video signal stored on the buffer 105 is transferred to the photometric evaluation section 106 and the focus detection section 107, respectively.

The photometric evaluation section 106 obtains the luminance level in the video signal, and, in consideration of the ISO sensitivity and shutter speed settings, controls an aperture value of the aperture 101 and the electronic shutter speed of the CCD 102 so that a correctly exposed image can be obtained.

The focus detection section 107 detects the edge strength in the video signal, and controls the AF motor 103 to maximize the edge strength to obtain a focus image.

After focus and exposure are adjusted in this manner, when the user fully presses the shutter button having a two-step switch on the external I/F section 116, the image processing device serving as the image pickup apparatus enters into an actual photographing mode.

Then, as in the pre-photographing mode, the video signal is transferred to the buffer 105. The actual photographing is performed based on the exposure condition obtained by the photometric evaluation section 106, and the focus condition obtained by the focus detection section 107, and these conditions at the time of photographing are transferred to the control section 115.

The video signal in the buffer 105 obtained by the actual photographing is transferred to the interpolation section 108.

Under the control of the control section 115, the interpolation section 108 generates a three-CCD video signal on which publicly known interpolation is performed, and transfers the video signal to the WB section 109.

Under the control of the control section 115, the WB section 109 multiplies each color signal by a predetermined white balance coefficient to perform white balance processing. The WB section 109 transfers the video signal after white balance processing to the region defining section 110 and the color conversion section 111, respectively.

Under the control of the control section 115, the region defining section 110 which serves as region defining means and achromatic region defining means, estimates the amount of noise included in the video signal, and, based on the estimated amount of noise, adaptively defines an achromatic region in an RGB color space.

Under the control of the control section 115, the color conversion section 111, which serves as color conversion means and linear conversion means, determines whether or not each pixel belongs to the achromatic region based on the information for defining the achromatic region obtained by the region defining section 110. The color conversion section 111 performs, on the RGB signal of a pixel determined to belong to the achromatic region, color conversion processing appropriate to achromatic region. On the other hand, on the RGB signal of a pixel determined not to belong to the achromatic region, that is, a pixel determined to belong to a chromatic region, the color conversion section 111 performs color conversion processing appropriate to chromatic region. The color conversion section 111 transfers the RGB signal after color conversion processing to the signal processing section 112.

Under the control of the control section 115, the signal processing section 112 performs publicly known gradation conversion processing and edge enhancement processing on the RGB signal, and transfers the signal after processing to the compression section 113.

Under the control of the control section 115, the compression section 113 performs compression processing, such as publicly known JPEG, on the video signal from the signal processing section 112, and transfers the video signal after compression processing to the output section 114.

Under the control of the control section 115, the output section 114 records and stores on a recording medium such as a memory card, the video signal after compression processing outputted from the compression section 113.

Next, FIG. 3 is a block diagram illustrating an example of the configuration of the region defining section 110.

The region defining section 110 has an average calculation section 200, a noise calculation section 201, a noise function ROM 202, a coefficient calculation section 203 and a coefficient calculation function ROM 204.

The WB section 109 is connected to the average calculation section 200. The average calculation section 200 is connected to the noise calculation section 201. The noise function ROM 202 is connected to the noise calculation section 201. The noise calculation section 201 is connected to the coefficient calculation section 203. The coefficient calculation function ROM 204 is connected to the coefficient calculation section 203. The coefficient calculation section 203 is connected to the color conversion section 111.

The control section 115 is bidirectionally connected to and controls the average calculation section 200, the noise calculation section 201 and the coefficient calculation section 203.

Under the control of the control section 115, the average calculation section 200 calculates an average AveG over the entire image, for one color signal from the video signals transferred from the WB section 109, which, in the present embodiment, is the G-color signal among the RGB color signals, and transfers the average to the noise calculation section 201.

The noise calculation section 201, which serves as noise amount estimation means, receives photographing information such as the ISO sensitivity and white balance coefficient from the control section 115. The noise calculation section 201 then reads a noise function according to the photographing information from the noise function ROM 202. Next, the noise calculation section 201 uses the read noise function to estimate the amount of noise N based on the average AveG transferred from the average calculation section 200. The technique described in Japanese Patent Application Laid- Open Publications No. 2004-72422 and No. 2004-266323 described above may be used to estimate the amount of noise. The noise calculation section 201 transfers the amount of noise N estimated in this manner to the coefficient calculation section 203. Note that although both the ISO sensitivity and white balance coefficient are used herein, either one of them may be used, Alternatively, in addition to the ISO sensitivity and white balance coefficient, temperature information of the CCD 102 may be used.

The coefficient calculation section 203, which can serve as both of linear function means and nonlinear function means, reads a constant term of a function for calculating the achromatic region defining coefficient from the coefficient calculation function ROM 204 to calculate the achromatic region defining coefficient corresponding to the amount of noise N transferred from the noise calculation section 201.

Here, in the present embodiment, as shown in FIG. 4, a straight line such that the ratio of R, G, and B in the RGB color space is 1:1:1 is regarded as an achromatic axis, and a cylindrical region with a radius "radius" centered on the achromatic axis is regarded as an achromatic region. In this case, the radius "radius" with respect to the achromatic axis of the cylindrical achromatic region is an achromatic region defining coefficient. FIG. 4 is a diagram illustrating an example of the achromatic region set in the RGB color space.

Figure 6:
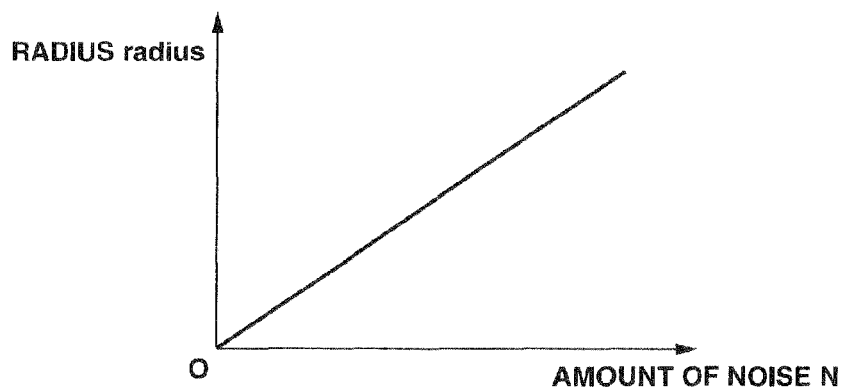
FIG. 6 is a diagram illustrating an example of a linear coefficient calculation function for calculating an achromatic region defining coefficient "radius" based on the amount of noise N according to the embodiment 1.
Figure 7:
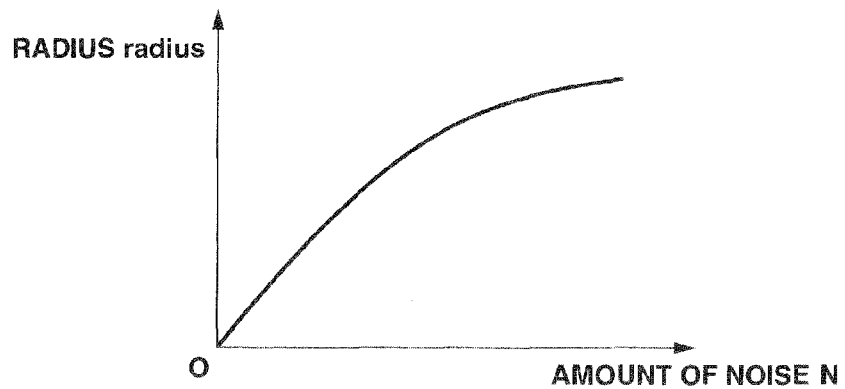
FIG. 7 is a diagram illustrating an example of a nonlinear coefficient calculation function for calculating an achromatic region defining coefficient "radius" based on the amount of noise N according to the embodiment 1.

The coefficient calculation section 203 calculates the achromatic region defining coefficient "radius" using a monotone increasing function shown in FIGS. 6 and 7, based on the estimated amount of noise N. FIG. 6 is a diagram illustrating an example of a linear coefficient calculation function for calculating the achromatic region defining coefficient "radius" based on the amount of noise N, and FIG. 7 is a diagram illustrating an example of a nonlinear coefficient calculation function for calculating the achromatic region defining coefficient "radius" based on the amount of noise N. For example, the coefficient calculation function shown in FIG. 6 is represented as shown in the following numerical expression 1:

$$\text{radius} = \alpha \cdot N + \beta \quad \text{[Expression 1]}$$

where $\alpha$ and $\beta$ are constant terms.

Further, for example, the coefficient calculation function shown in FIG. 7 is represented as shown in the following numerical expression 2:

$$\text{radius} = \gamma \cdot N^2 + \delta \cdot N + \epsilon \quad \text{[Expression 2]}$$

where $\gamma$, $\delta$, and $\epsilon$ are constant terms.

Note that an example of the coefficient calculation function when $\alpha>0$ and $\beta=0$ is shown in FIG. 6. Further, an example of the coefficient calculation function when $\gamma<0$, $\delta>0$, and $\epsilon=0$ is shown in FIG. 7 (note that the function is clipped at the maximum point since the radius "radius" switches to diminution from the maximum point onward when $\gamma<0$).

The constant terms $\alpha$ and $\beta$, or constant terms $\gamma$, $\delta$ and $\epsilon$ of the coefficient calculation function described above are recorded on the coefficient calculation function ROM 204 in advance. The coefficient calculation section 203 reads the constant terms of a predetermined function from the coefficient calculation function ROM 204 to perform a function operation as shown in Expressions 1 and 2.

The coefficient calculation section 203 transfers the achromatic region defining coefficient "radius" calculated in this manner to the color conversion section 111.

Note that a case where a linear function shown in Expression 1, or a quadratic function shown in Expression 2 is used as a coefficient calculation function has been illustrated above, but without being limited thereto, any nonlinear functions or any polylinear functions may be applied, such as continuous functions in which the radius "radius" increases with increasing amount of noise N (may be constant, as long as there is no decrease).

In addition, the achromatic region defining coefficient "radius" has been obtained from the amount of noise N by using a function, but without being limited thereto, a table in which the relationship between any of the amount of noise N and the achromatic region defining coefficient "radius" is recorded in advance may be used to obtain the achromatic region defining coefficient.

Figure 8:
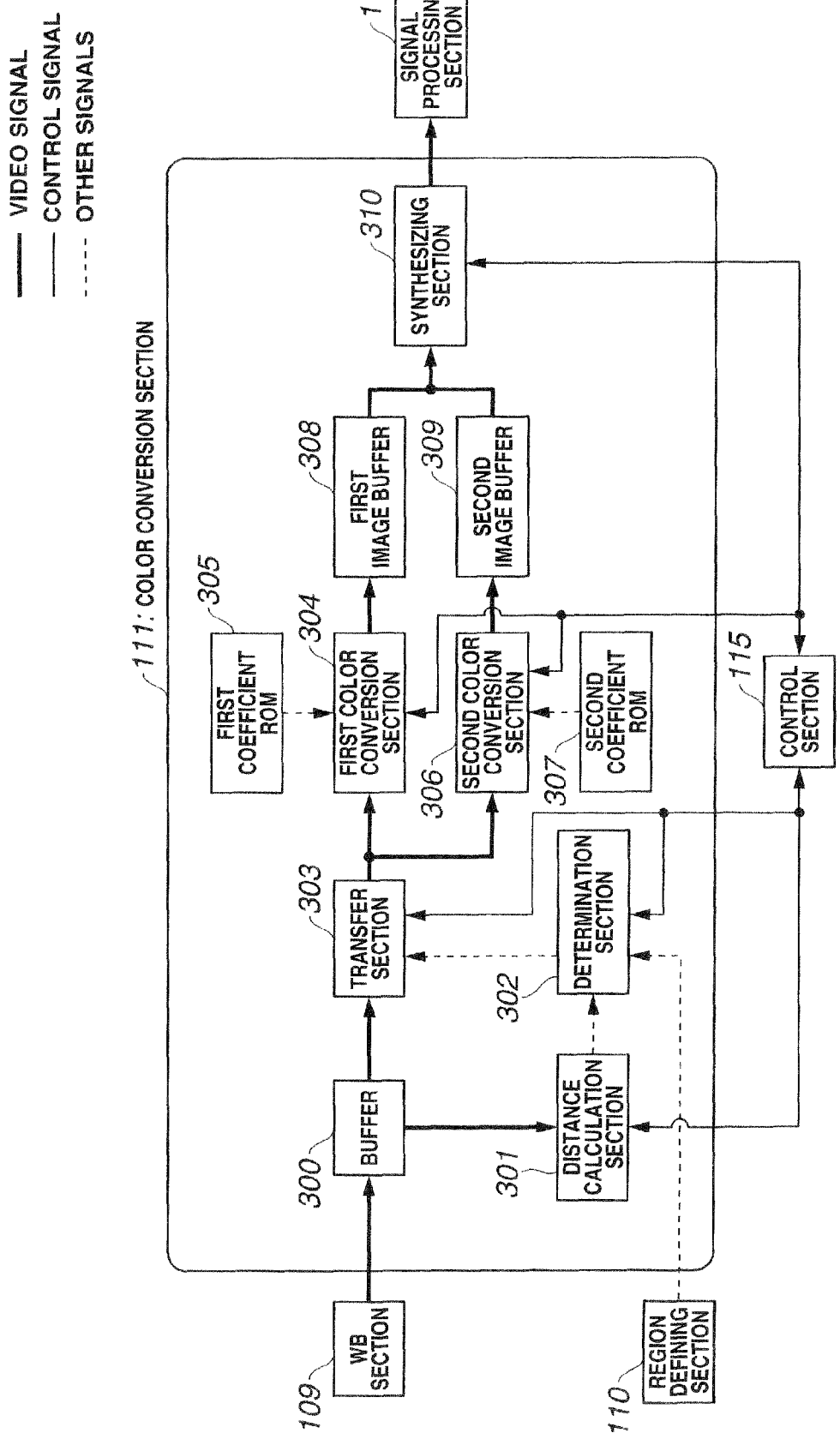
FIG. 8 is a block diagram illustrating an example of the configuration of a color conversion section according to the embodiment 1.

Next, FIG. 8 is a block diagram illustrating an example of the configuration of the color conversion section 111.

The color conversion section 111 has a buffer 300, a distance calculation section 301, a determination section 302, a transfer section 303, a first color conversion section 304, a first coefficient ROM 305, a second color conversion section 306, a second coefficient ROM 307, a first image buffer 308, a second image buffer 309 and a synthesizing section 310.

The WB section 109 is connected to the buffer 300. The buffer 300 is connected to the distance calculation section 301 and the transfer section 303. The distance calculation section 301 is connected to the determination section 302. The region defining section 110 is connected to the determination section 302. The determination section 302 is connected to the transfer section 303. The transfer section 303 is connected to the first color conversion section 304 and the second color conversion section 306. The first coefficient ROM 305 is connected to the first color conversion section 304. The second coefficient ROM 307 is connected to the second color conversion section 306. The first color conversion section 304 is connected to the first image buffer 308. The second color conversion section 306 is connected to the second image buffer 309. The first image buffer 308 and the second image buffer 309 are connected to the synthesizing section 310. The synthesizing section 310 is connected to the signal processing section 112.

The control section 115 is bidirectionally connected to and controls the distance calculation section 301, the determination section 302, the transfer section 303, the first color conversion section 304, the second color conversion section 306 and the synthesizing section 310.

The video signal transferred from the WB section 109 is stored on the buffer 300.

The distance calculation section 301 reads the RGB signal stored on the buffer 300 on a pixel basis to calculate a distance between a pixel point on the RGB color space shown by the RGB signal and the achromatic axis on the RGB color space (that is, a minimum value of the distances between the pixel point and any point on the achromatic axis).

More specifically, when any color signal in the RGB color space is represented as $(r_i, g_i, b_i)$, and the achromatic axis in the RGB color space (assuming that the achromatic axis passes through the origin of the RGB color space) is represented by the following linear expression as shown in Expression 3:

$$\frac{R}{l} = \frac{G}{m} = \frac{B}{n} \quad \text{[Expression 3]}$$

the distance calculation section 301 calculates the distance "dist" between any point $(r_i, g_i, b_i)$ and the achromatic axis using the following Expression 4:

$$\text{dist} = \sqrt{(r_i^2 + g_i^2 + b_i^2) - \frac{(lr_i + mg_i + nb_i)^2}{l^2 + m^2 + n^2}} \quad \text{[Expression 4]}$$

where l, m and n are constant terms, and (l, m, n) represents a directional vector of the achromatic axis.

Therefore, if a straight line such that the ratio of R, G, B is 1:1:1 can be regarded as an achromatic axis, the straight line can be placed so as to be $l=m=n=1$ (alternatively, when the directional vector is normalized, $l=m=n=1/\sqrt{3}$), and Expressions 3 and 4 are represented as show in Expressions 5 and 6, respectively.

$$R = G = B \quad \text{[Expression 5]}$$

$$\text{dist} = \sqrt{(r_i^2 + g_i^2 + b_i^2) - \frac{1}{3}(r_i + g_i + b_i)^2} \quad \text{[Expression 6]}$$

Then, the distance calculation section 301 transfers the calculated distance "dist" to the determination section 302.

The determination section 302, which serves as determination means, hue region determination means and comparison/discrimination means, compares the distance "dist" transferred from the distance calculation section 301 with the achromatic region defining coefficient "radius" obtained through the region defining section 110, and transfers a flag signal "flag" based on the comparison result as shown in the following Expression 7 to the transfer section 303.

$$\text{flag} = \begin{cases} 1 & (\text{when radius} \geq \text{dist}) \\ 0 & (\text{when radius} < \text{dist}) \end{cases} \quad \text{[Expression 7]}$$

That is to say, the determination section 302 sets the flag signal "flag" to 1 if the distance "dist" is equal to or less than the achromatic region defining coefficient "radius", or the determination section 302 sets the flag signal "flag" to 0 if the distance "dist" is larger than the achromatic region defining coefficient "radius". Namely, a video signal having the flag signal "flag" 1 is a signal for the achromatic region, and a video signal having the flag signal "flag" 0 is a signal for the chromatic region.

Based on the flag signal "flag" transferred from the determination section 302, the transfer section 303 transfers the video signal of the pixel of interest to the first color conversion section 304 if the flag signal "flag" is 1, or the transfer section 303 transfers the video signal of the pixel of interest to the second color conversion section 306 if the flag signal "flag" is 0, respectively.

The first color conversion section 304, which serves as a first color conversion section, and the second color conversion section 306, which serves as a second color conversion section, perform different color conversion processing from each other on the video signal of the pixel of interest. In the present embodiment, the first color conversion section 304 and the second color conversion section 306 perform a matrix operation as shown in the following Expression 8 on the input RGB signal $r_i, g_i, b_i$ to calculate the RGB signal, $r_i', g_i', b_i'$ after color conversion processing:

$$\begin{pmatrix} r_i' \\ g_i' \\ b_i' \end{pmatrix} = \begin{pmatrix} a & b & c \\ d & e & f \\ g & h & i \end{pmatrix} \begin{pmatrix} r_i \\ g_i \\ b_i \end{pmatrix} \quad \text{[Expression 8]}$$

where a to i on the right side of the matrix are parameters of a conversion matrix (matrix coefficients).

That is to say, conversion matrix coefficients used by the first color conversion section 304 are recorded on the first coefficient ROM 305 in advance, and conversion matrix coefficients used by the second color conversion section 306 are recorded on the second coefficient ROM 307 in advance. Then, the first color conversion section 304 reads a predetermined matrix coefficient from the first coefficient ROM 305 to perform the matrix operation as shown in Expression 8, and the second color conversion section 306 reads a predetermined matrix coefficient from the second coefficient ROM 307 to perform the matrix operation as shown in Expression 8.

The color conversion processing is performed with the aim of achieving correct color reproduction, and matrix coefficients described below are recorded as a concrete example on the first coefficient ROM 305 and the second coefficient ROM 307.

First, the conversion matrix coefficients recorded on the first coefficient ROM 305 are matrix coefficients letting through an RGB signal belonging to the achromatic region transferred from the transfer section 303, as-is, without performing color conversion processing (matrix coefficients in the form of a unit matrix), or matrix coefficients performing projection onto the achromatic axis. Here, the unit matrix is represented as shown in the following Expression 9, and the matrix performing projection onto the achromatic axis shown in Expression 5 is represented as shown in the following Expression 10.

$$\begin{pmatrix} 1 & 0 & 0 \\ 0 & 1 & 0 \\ 0 & 0 & 1 \end{pmatrix} \quad \text{[Expression 9]}$$

$$\frac{1}{3}\begin{pmatrix} 1 & 1 & 1 \\ 1 & 1 & 1 \\ 1 & 1 & 1 \end{pmatrix} \quad \text{[Expression 10]}$$

The conversion matrix coefficients recorded on the second coefficient ROM 307 are matrix coefficients calculated by, for example, a least square so that an numerical error between a target color signal for a correct color reproduction and the color signal after color conversion processing is minimized.

Note that if different color conversion processing was performed for the achromatic region and the chromatic region, color continuity would be lost in a boundary between the achromatic region and the chromatic region. Thus, an example of the configuration of the color conversion section 111 to keep color continuity is shown in FIG. 9.

Figure 9:
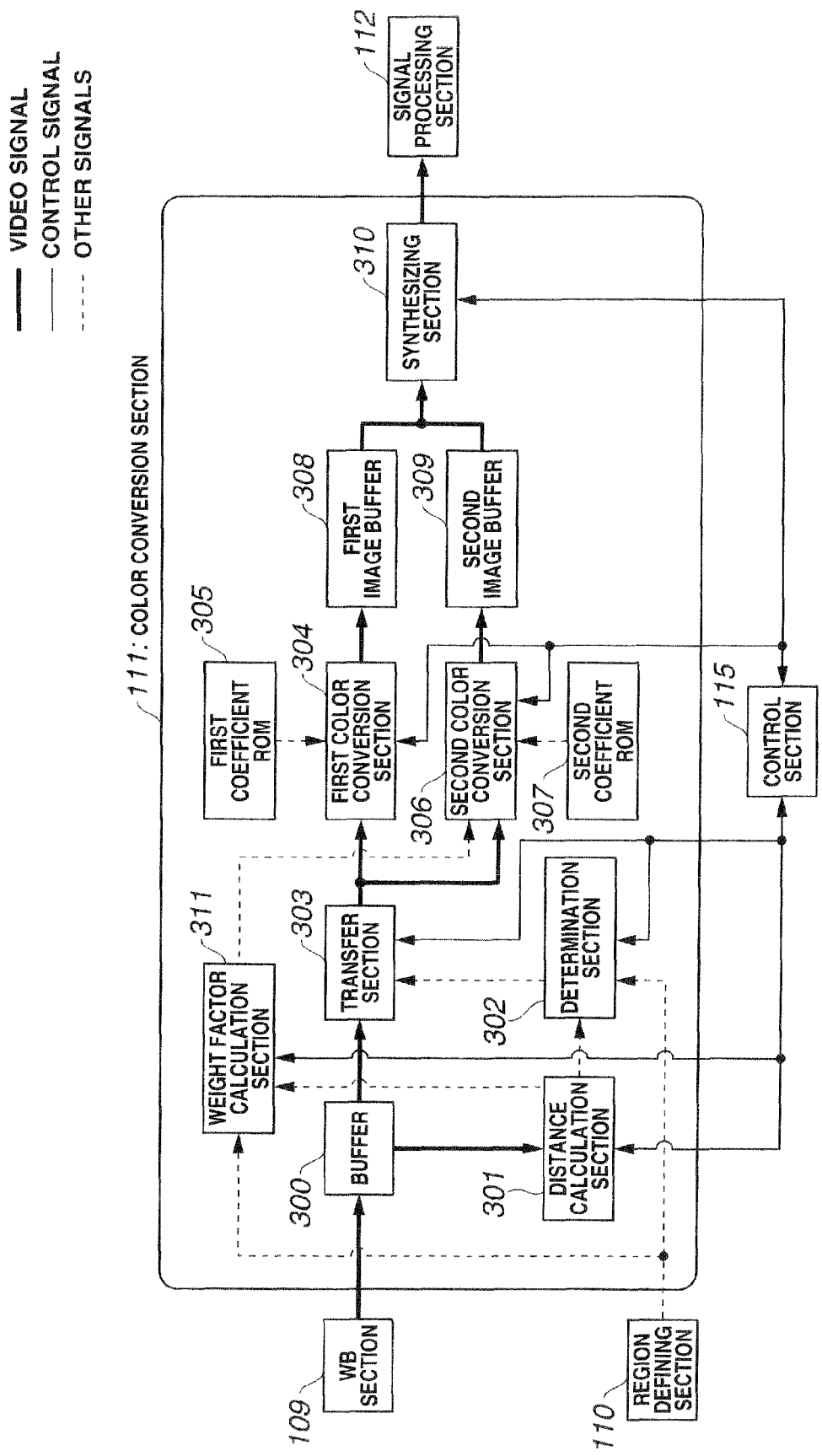
FIG. 9 is a block diagram illustrating another example of the configuration of a color conversion section according to the embodiment 1.

FIG. 9 is a block diagram illustrating another example of the configuration of the color conversion section 112. The color conversion section 111 shown in FIG. 9 multiplies a matrix coefficient by a weighting factor (0 to 10) depending on signals to control the color conversion processing.

The color conversion section shown in FIG. 9 has a configuration in which a weighting factor calculation section 311 is added to the color conversion section 111 shown in FIG. 8. Since other basic configuration is the same as that of the color conversion section 111 shown in FIG. 8, the same designations and reference numerals are assigned to the same components, the description thereof will be omitted as appropriate, and mainly, only different portions will be described.

The region defining section 110 is also connected to the weighting factor calculation section 311. The distance calculation section 301 is also connected to the weighting factor calculation section 311. The weighting factor calculation section 311 is connected to the second color conversion section 306. The control section 115 is bidirectionally connected to and controls the weighting factor calculation section 311.

First, a case where the first color conversion section 304 converts the RGB signal belonging to the achromatic region transferred from the transfer section 303 using a unit matrix as shown in Expression 9 (i.e., letting through the signal without performing color conversion processing) will be described. The weighting factor calculation section 311 calculates a distance "t_dist" between the boundary between the achromatic region and the chromatic region and any color signal coordinate, based on information from the region defining section 110 (achromatic region defining coefficient "radius") and information from the distance calculation section 301 (distance "dist") (e.g., can be calculated with "t_dist=dist−radius" for the chromatic region where flag=0 (that is, radius>dist) when the achromatic region as shown in FIG. 4 is utilized). The weighting factor calculation section 311 calculates a weighting factor w(t_dist) (where 0≦w(t_dist)≦1.0), which is multiplied to the matrix coefficient according to the calculated distance t_dist. Note that an example of the simplest function of the weighting factor w(t_dist) is shown in the following Expression 11.

$$w(\text{t\_dist}) = \begin{cases} \dfrac{\text{t\_dist}}{\Delta\text{radius}} & (\text{when } 0 < \text{t\_dist} \leq \Delta\text{radius}) \\ 1 & (\text{when } \Delta\text{radius} < \text{t\_dist}) \end{cases}$$ [Expression 11]

When a region within the chromatic region (a shell region outside the achromatic region) neighboring the boundary between the achromatic region and the chromatic region, is referred to as a boundary-neighboring region, the boundary-neighboring region is defined as a region of radius<dist≦ (radius+Δradius) (namely, a region of 0<t_dist≦Δradius). The chromatic region further outward beyond the boundary-neighboring region is subjected to normal color conversion processing.

Then, the weighting factor calculation section 311 outputs the calculated weighting factor w to the second color conversion section 306. The second color conversion section 306 calculates a corrected color conversion matrix by performing a weighting operation on a matrix shown on the right side of Expression 8 read from the second coefficient ROM 307 (a matrix designed such that the error between the signal of the entire color region and a target signal with respect thereto is minimized), and the unit matrix shown in Expression 9, based on the weighting factor w received from the weighting factor calculation section 311, as shown in the following Expression 12:

$$\begin{pmatrix} a' & b' & c' \\ d' & e' & f' \\ g' & h' & i' \end{pmatrix} = (1-w)\begin{pmatrix} 1 & 0 & 0 \\ 0 & 1 & 0 \\ 0 & 0 & 1 \end{pmatrix} + w\begin{pmatrix} a & b & c \\ d & e & f \\ g & h & i \end{pmatrix}$$ [Expression 12]

On the other hand, when the first color conversion section 304 projects a signal belonging to the achromatic region onto the achromatic axis using the matrix shown in Expression 10, the second color conversion section 306 calculates a corrected color conversion matrix by performing a weighting operation on a matrix shown on the right side of Expression 8 read from the second coefficient ROM 307 (a matrix designed such that the error between the signal of the entire color region and a target signal with respect thereto is minimized) and a matrix for performing projection onto the achromatic axis shown in Expression 10, based on the weighting factor w received from the weighting factor calculation section 311, as shown in the following Expression 13:

$$\begin{pmatrix} a' & b' & c' \\ d' & e' & f' \\ g' & h' & i' \end{pmatrix} = \frac{1}{3}(1-w)\begin{pmatrix} 1 & 1 & 1 \\ 1 & 1 & 1 \\ 1 & 1 & 1 \end{pmatrix} + w\begin{pmatrix} a & b & c \\ d & e & f \\ g & h & i \end{pmatrix}$$ [Expression 13]

Then, the second color conversion section 306 performs color conversion processing on the chromatic region by performing the operation shown in Expression 8 using the corrected color conversion matrix as shown in Expression 12 or 13.

In this manner, the color conversion processing is performed on the chromatic region near the boundary (boundary-neighboring region) only to an extent that corresponds to the distance from the boundary, thus color continuity between the achromatic region and the chromatic region can be kept.

Returning to the description in common to FIGS. 8 and 9, color signals of each pixel on which the color conversion processing is performed by the first color conversion section 304 are transferred to the first image buffer 308, and color signals of each pixel on which the color conversion processing is performed by the second color conversion section 306 are transferred to the second image buffer 309, respectively.

Then, after the color conversion processing is performed on all of the video signals, the video signals stored on the first image buffer 308 and the video signals stored on the second image buffer 309 are transferred to the synthesizing section 310.

The synthesizing section 310 synthesizes the video signals after color conversion processing, which have been transferred. The synthesizing section 310 then transfers the synthesized video signal to the signal processing section 112.

Note that an example has been described above where the color conversion section 304 and the second color conversion section 306 perform the matrix operation shown in Expression 8, to perform the color conversion processing, but the present embodiment is not limited thereto. For example, the color conversion processing may be performed by applying an LUT (color conversion table) on which correspondences between input signals and output signals are recorded in advance. In this case, predetermined LUT (color conversion table) coefficients, which are used by the first color conversion section 304 serving as table operation means are stored on the first coefficient ROM 305, and predetermined LUT (color conversion table) coefficients, which are used by the second color conversion section 306 serving as table operation means, are stored on the second coefficient ROM 307.

Note that although the image processing device into which the image pickup section is integrated including the lens system 100, the aperture 101, the CCD 102, the AF motor 103, the A/D conversion section 104, the photometric evaluation section 106, and the focus detection section 107, has been described above, the image processing device is not limited to having such configuration, and the image pickup section may be separated from the image processing device. That is to say, an image processing device, which reads from a recording medium and processes a video signal photographed by the separate image pickup section, and recorded on the recording medium such as a memory card in the form of untreated raw data, may be acceptable. However, in this case, photographing information (e.g., ISO sensitivity and white balance coefficient) should be recorded on a header or the like. Note that, without being limited to through a recording medium, transmission of various types of information from the separate image pickup section to the image processing device may be made through a communication line or the like.

Further, although the above description is made assuming on processing by hardware, the present invention is not limited to such configuration. For example, the video signal from the CCD 102 is recorded on a recording medium such as a memory card as untreated raw data, and photographing information (e.g., ISO sensitivity and white balance coefficient) from the control section 115 is also recorded on the recording medium as header information. Then, an image processing program, which is separate software, may be executed by a computer to read the information in the recording medium for processing. Note that similarly to the above description, without being limited to through a recording medium, transmission of various types of information from the image pickup section to the computer may be made through a communication line or the like.

Figure 10:
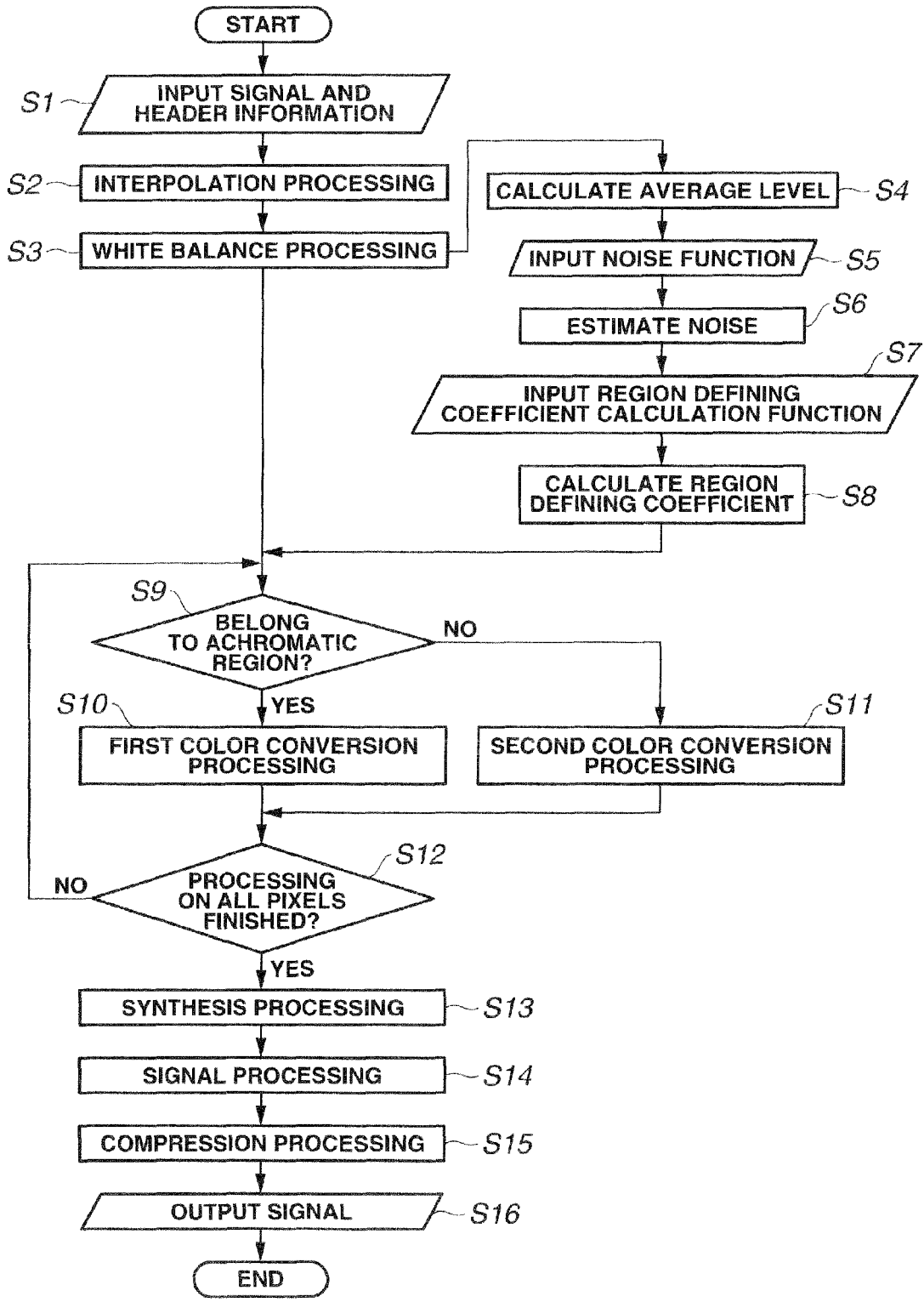
FIG. 10 is a flowchart illustrating color conversion processing by an image processing program according to the embodiment 1.

FIG. 10 is a flowchart illustrating the color conversion processing by the image processing program.

Upon starting the processing, first, an untreated video signal is read, and header information is read including the accompanying information related to image pickup conditions such as an ISO sensitivity and a white balance coefficient (step S1).

Next, interpolation is performed on the read untreated video signal to generate a three-CCD video signal (step S2).

Then, based on the read white balance coefficient, white balance processing is performed on the three-CCD video signal (step S3).

Further, the average of the G signals from all the pixels after white balance processing is calculated (step S4).

Thereafter, a noise function according to the photographing information such as the ISO sensitivity and white balance coefficient is read (step S5) to estimate the amount of noise N based on the read noise function (step S6).

Next, a function for calculating the achromatic region defining coefficient "radius" shown in FIGS. 6 and 7 is read (step S7), and, based on the read function, the achromatic region defining coefficient "radius" according to the amount of noise N, which was estimated in step S6, is calculated (step S8).

Then, based on the achromatic region defining coefficient "radius" calculated in step S8, whether or not a video signal for each pixel belongs to the achromatic region is determined (step S9).

If the signal is determined to belong to the achromatic region, the color conversion processing appropriate to the achromatic region is performed on the video signal obtained in step S3, for example, through the matrix operation (step S10).

On the other hand, if the signal is determined not to belong to the achromatic region in step S9, the color conversion processing appropriate to the chromatic region is performed on the video signal obtained in step S3, for example, through the matrix operation (step S11).

After processing of step S10 or step S11 is performed, whether the color conversion processing on all the pixels has been finished is determined (step S12).

If it is determined that the processing on all the pixels has not been finished yet, the process returns to step S9, where the above processing is performed on pixels, which have not been processed yet.

On the other hand, if it is determined that the processing on all the pixels has been finished in step S12, the video signal obtained by the processing in step S10 and the video signal obtained by the processing in step S11 are synthesized (step S13).

Next, signal processing such as publicly known gradation conversion processing and edge enhancement processing is performed on the synthesized video signal (step S14).

Then, compression processing such as publicly known JPEG is performed on the video signal (step S15), the video signal after processing is outputted (step S16), and the process is finished.

The image processing device and image processing program have been described above, but the present embodiment is not limited thereto, an image processing method for performing the above described processing is possible.

Note that although a single-plate CCD having a bayer type primary color filter on the front face has been described above by way of example, a color image pickup device is not limited thereto, and a single-plate CCD having a complementary color filter on the front face, or a three-CCD may be used. For example, when the single-plate CCD having a complementary color filter is utilized, a pseudo-luminance signal Y is generated from each of signals Cy, Mg, Ye and G, and based on the luminance signal Y, the amount of noise included in the video signal may be estimated.

Although, in the above description, the amount of noise included in the video signal is estimated on the basis of the three-CCD video signal, the estimation of the amount of noise is not limited thereto. For example, the amount of noise may be estimated on the basis of the bayer video signal before being interpolated into the three-CCD video signal. In this case, when, for example, the color image pickup device is the primary color single-plate CCD, the amount of noise may be estimated on the basis of the G bayer signal.

Figure 5:
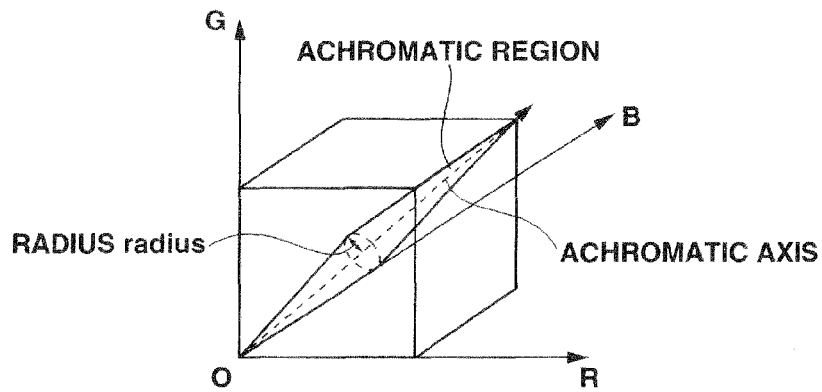
FIG. 5 is a diagram illustrating another example of the achromatic region set in the RGB color space according to the embodiment 1.

Further, although in the above description, a cylindrical region centered on the achromatic axis is regarded as an achromatic region, a way of defining the achromatic region is not limited thereto. For example, as shown in FIG. 5, the achromatic region may also be defined so that the region to be achromatic adaptively changes according to the brightness of the video signal. Here, FIG. 5 is a diagram illustrating another example of the achromatic region set in the RGB color space. The example shown in FIG. 5 illustrates a case where the achromatic region is set in such a way that the radius "radius" takes the maximum value at the middle value of the luminance level, the radius "radius" gradually decreases as the luminance level decreases or increases from the middle value, and the radius "radius" converges to 0 at the maximum or minimal luminance.

In addition, in the above description, the achromatic region is set with respect to the entire image, but without being limited thereto, an image may be divided into several segment regions, an achromatic region may be set for each segment region, and for each segment region, different color conversion processing may be performed for the achromatic region and the chromatic region. This allows more appropriate color conversion processing to each segment region to be performed, thus obtaining high-quality video signals.

According to the embodiment 1, the amount of noise is estimated, based on the estimated amount of noise, an achromatic region is adaptively defined, and different color conversion processing is performed for the achromatic region and the chromatic region, thus, a low chroma color can be appropriately converted with high precision.

Since the configuration of performing color conversion by matrix operation processing is identical to that in prior art, it suffices to add simply one configuration performing color conversion by matrix operation processing, thus, there is the advantage that compatibility for conventional image processing devices being high, implementation is easy. A case where the LUT is applied in place of matrix operation processing also has the advantage that compatibility for conventional image processing devices being high, implementation is easy.

Consequently, according to the present embodiment, high-quality and high-precision color conversion processing can be performed according to whether a video signal belongs to an achromatic region.

Embodiment 2

Figure 11:
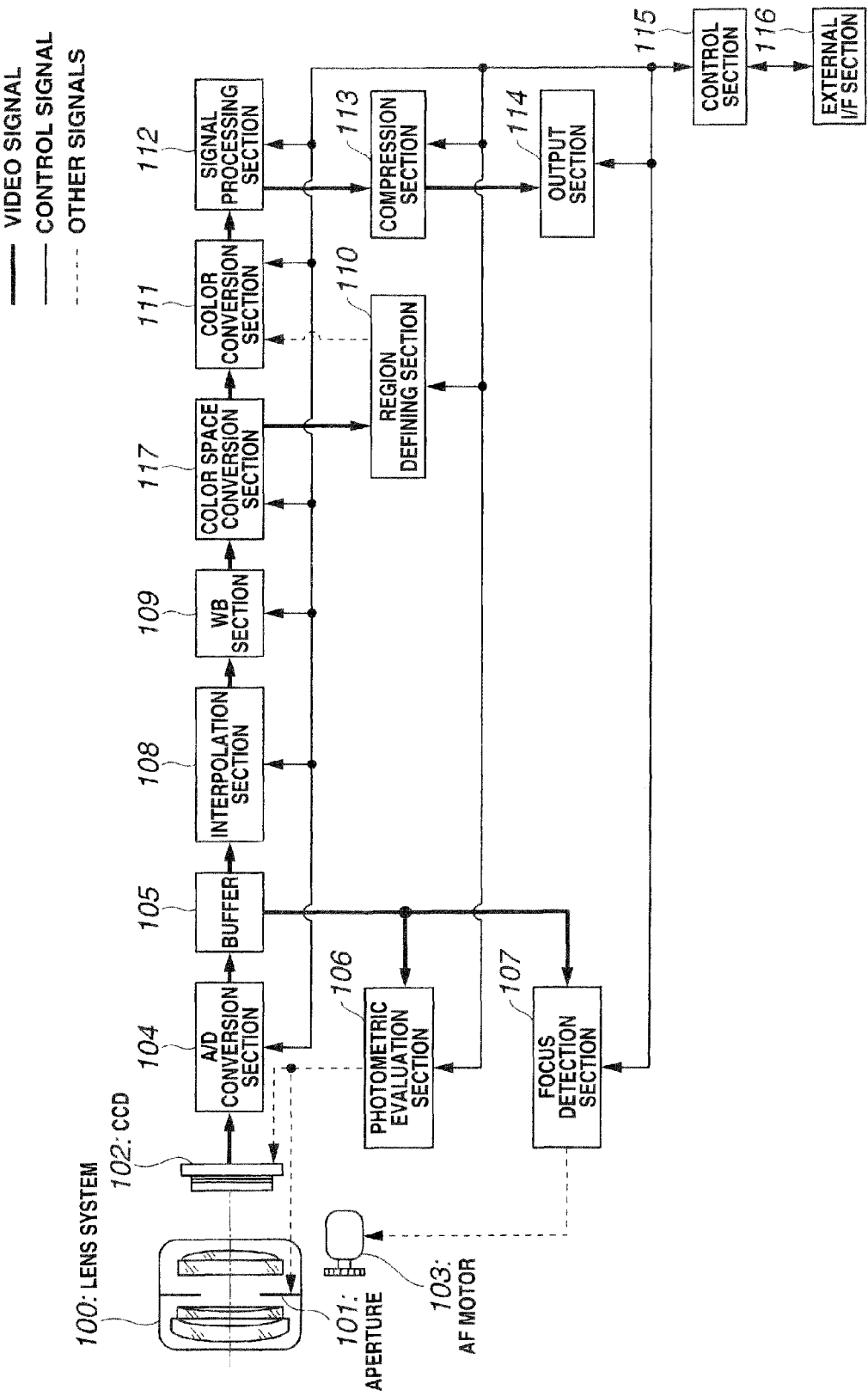
FIG. 11 is a block diagram illustrating the configuration of an image processing device according to an embodiment 2 of the present invention.

FIGS. 11 to 15 illustrate an embodiment 2 of the present invention, and FIG. 11 is a block diagram illustrating the configuration of an image processing device. In the embodiment 2, the same reference numerals are assigned to the same components as those of the embodiment 1, the description thereof will be omitted, and mainly, only different points will be described.

The image processing device according to the present embodiment has a configuration in which a color space conversion section 117 serving as color space conversion means is added to the configuration of the above described embodiment 1 shown in FIG. 1.

The WB section 109 is connected to the color space conversion section 117. The color space conversion section 117 is connected to the region defining section 110 and the color conversion section 111. The control section 115 is also bidirectionally connected to and controls the color space conversion section 117.

Further, the external I/F section 116 according to the present embodiment also serves as hue dividing means for dividing a color space into a plurality of hue regions, which will be described later.

The actions of the image processing device shown in FIG. 11 are basically the same as those shown in FIG. 1 of the embodiment 1; therefore, only different portions will now be described along the flow of a signal.

The video signal subjected to the white balance processing by the WB section 109 is transferred to the color space conversion section 117. The color space conversion section 117 converts the transferred video signal into a video signal for a predetermined color space, for example, a video signal for a YCbCr color space in the present embodiment. The color space conversion section 117 transfers the converted YCbCr signal to the region defining section 110 and the color conversion section 111.

The region defining section 110 estimates the amount of noise, and, based on the estimated amount of noise of the video signal, defines a region that is to be an achromatic region in the YCbCr color space.

The color conversion section 111 determines whether a YCbCr signal of each pixel belongs to the defined achromatic region, and performs the color conversion processing according to the determination result. Then the color conversion section 111 transfers the YCbCr signal after color conversion processing to the signal processing section 112.

Subsequent processings are almost the same as those of the embodiment 1 described above.

Figure 12:
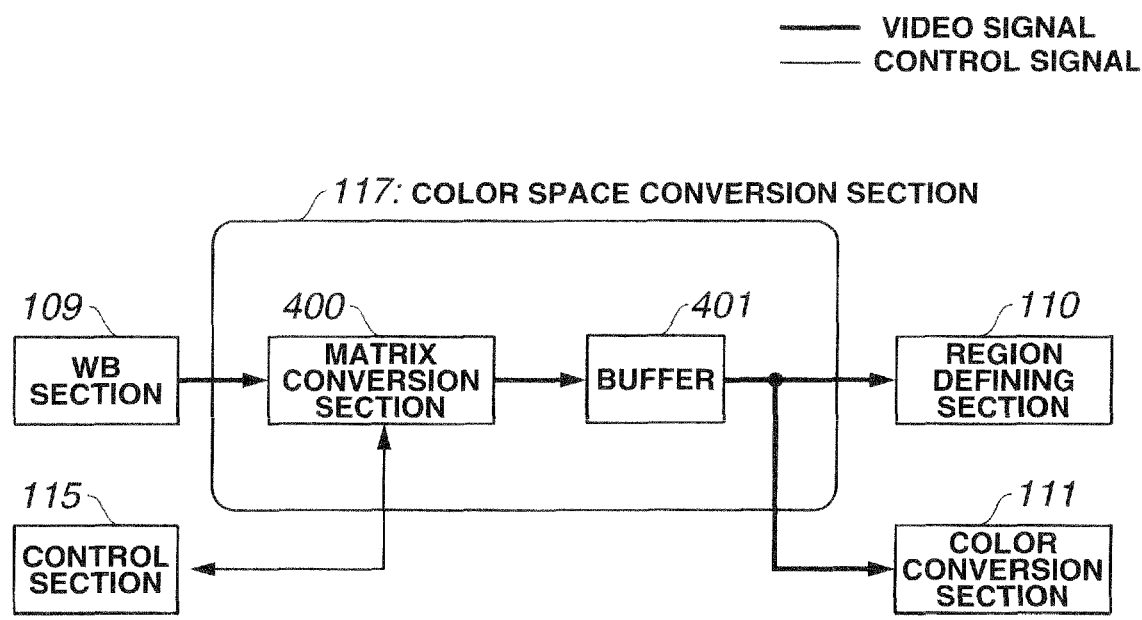
FIG. 12 is a block diagram illustrating an example of the configuration of a color space conversion section according to the embodiment 2.

Next, FIG. 12 is a block diagram illustrating an example of the configuration of the color space conversion section 117.

The color space conversion section 117 has a matrix conversion section 400 and a buffer 401.

The WB section 109 is connected to the matrix conversion section 400. The matrix conversion section 400 is connected to the buffer 401. The buffer 401 is connected to the region defining section 110 and the color conversion section 111. The control section 115 is bidirectionally connected to and controls the matrix conversion section 400.

The matrix conversion section 400 reads the RGB signal transferred from the WB section 109 on a pixel basis, and performs the matrix operation as shown in the following Expression 14 to convert the signal into a YCbCr signal.

$$\begin{pmatrix} Y \\ Cb \\ Cr \end{pmatrix} = \begin{pmatrix} 0.2990 & 0.5870 & 0.1140 \\ -0.1687 & -0.3313 & 0.5000 \\ 0.5000 & -0.4187 & -0.0813 \end{pmatrix} \begin{pmatrix} R \\ G \\ B \end{pmatrix} \quad \text{[Expression 14]}$$

The YCbCr signal calculated in this manner is stored on the buffer 401.

Note that above description has illustrated the YCbCr color space as an example of a color space converted by the color space conversion section 117, but without being limited thereto. For example, a color space may be converted into any color space such as a CIE-Lab color space and a CIE-Luv color space.

Figure 13:
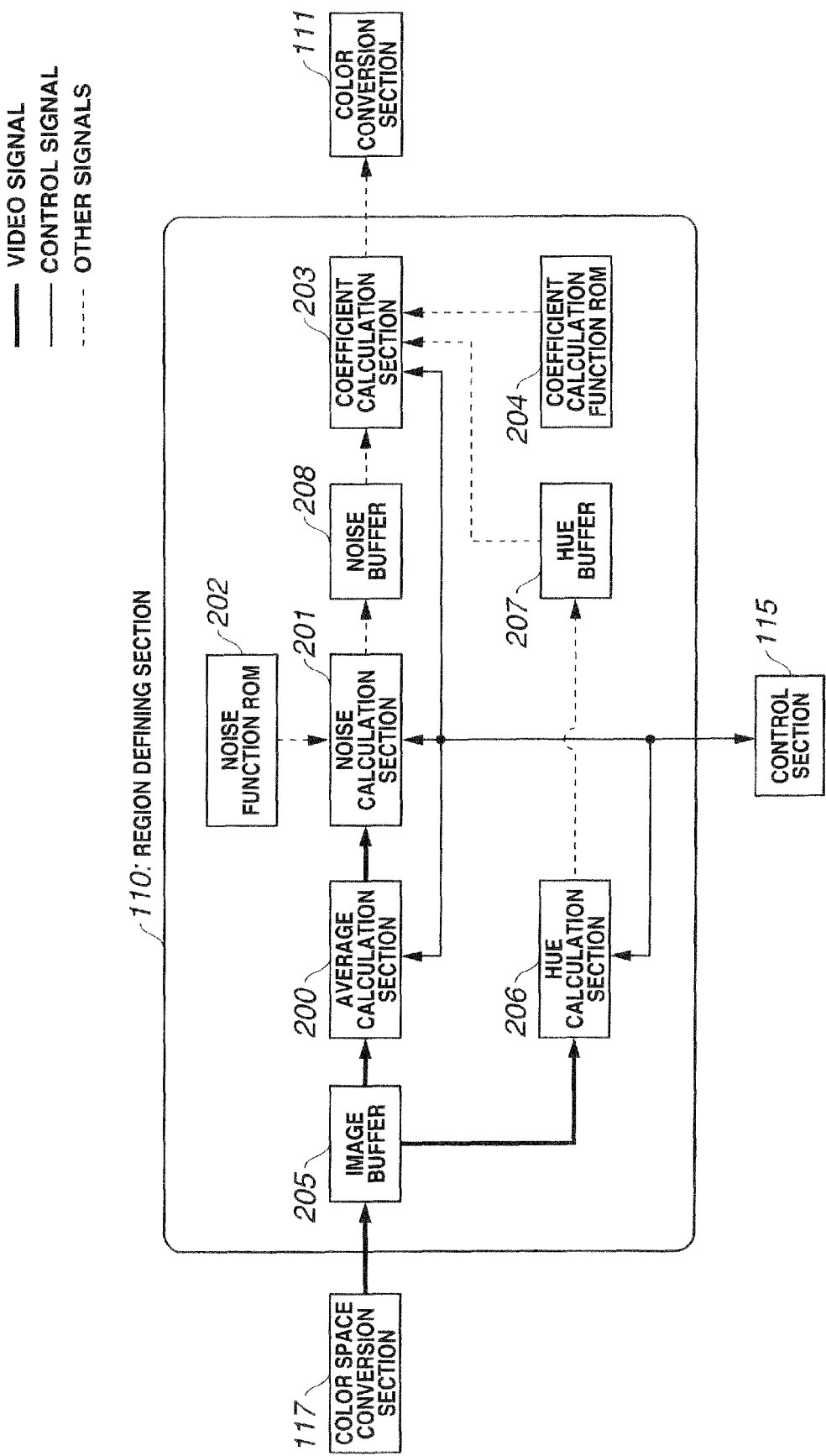
FIG. 13 is a block diagram illustrating an example of the configuration of a region defining section according to the embodiment 2.

Next, FIG. 13 is a block diagram illustrating an example of the configuration of the region defining section 110.

The region defining section 110 has a configuration in which an image buffer 205, a hue calculation section 206, a hue buffer 207 and a noise buffer 208 are added to the configuration of the region defining section shown in FIG. 3. Since other basic configuration is the same as that of the region defining section 110 shown in FIG. 3, mainly, only different portions will be described.

The color space conversion section 117 is connected to the image buffer 205. The image buffer 205 is connected to the average calculation section 200 and the hue calculation section 206. The hue calculation section 206 is connected to the hue buffer 207. The hue buffer 207 is connected to the coefficient calculation section 203. The noise calculation section 201 is connected to the noise buffer 208. The noise buffer 208 is connected to the coefficient calculation section 203. The control section 115 is also bidirectionally connected to and controls the hue calculation section 206.

The video signals transferred from the color space conversion section 117 are stored on the image buffer 205.

The average calculation section 200 calculates, on a pixel basis, the average AveY of the video signal transferred from the image buffer 205, in the present embodiment, a luminance signal Y in a predetermined local region centered on the pixel of interest, and transfers the average AveY to the noise calculation section 201. Note that although in the above described embodiment 1, the average AveG is obtained based on the G color signals of the entire image, the average AveY is obtained for each local region this time (for each pixel of interest positioned at the center of the local region). In addition, a case where the average calculation section 200 obtains the average AveY of the luminance signal Y has been illustrated, but without being limited thereto, the average of the color difference signals Cr and Cb may be determined.

The hue calculation section 206 reads the YCbCr signal from the image buffer 205 on a pixel basis, and calculates the hue signal H for each pixel by the following Expression 15.

$$H = \tan^{-1}\left(\frac{Cb}{Cr}\right)$$ [Expression 15]

Note that in the above description, a case where the hue calculation section 206 calculates a hue signal by a mathematical operation has been illustrated, but without being limited thereto. For example, as a table, the relationship between the ratio of Cr to Cb and a hue angle may be stored on the first coefficient ROM 305 and the second coefficient ROM 307 in advance. Then, the slope of a straight line connecting the origin to the Cr and Cb signals of the pixel of interest may be calculated, and, based on the ratio of Cr to Cb indicated by the slope, the first color conversion section 304 and the second color conversion section 306 may make reference to the table to obtain the hue signal H.

Then the hue calculation section 206 transfers the calculated hue signal H to the hue buffer 207.

The noise calculation section 201 receives the photographing information such as an ISO sensitivity and a white balance coefficient from the control section 115. Then, the noise calculation section 201 reads the noise function corresponding to the photographing information from the noise function ROM 202. Next, the noise calculation section 201 uses the noise function to estimate, for each pixel, the amount of noise N corresponding to the average AveY transferred from the average calculation section 200. Then the noise calculation section 201 transfers the estimated amount of noise N to the noise buffer 208.

Figure 14:
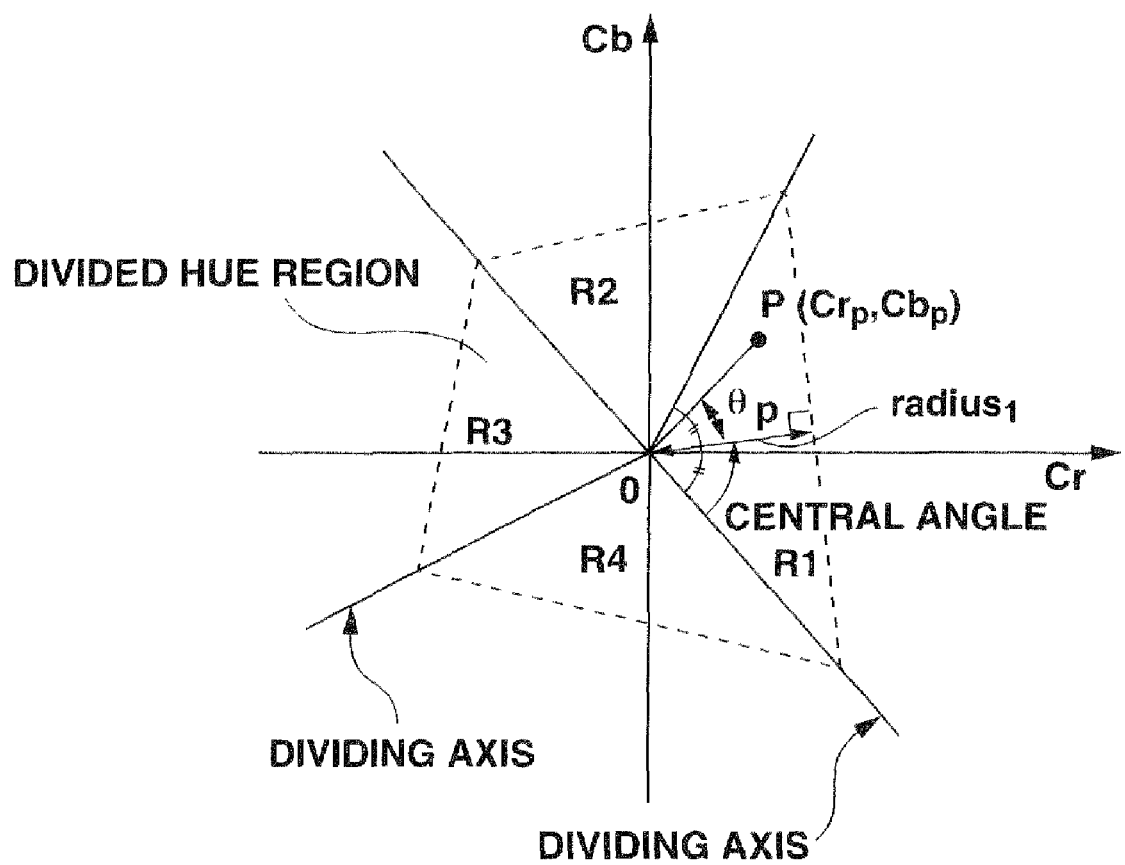
FIG. 14 is a diagram illustrating a state of an achromatic region defined according to hue regions according to the embodiment 2.

The coefficient calculation section 203 reads the hue signal H from the hue buffer 207, and reads the amount of noise N from the noise buffer 208, to calculate an average amount of noise $AveN_j$ for each of the plurality of hue regions R1 to R4 shown in FIG. 14, for example (which are collectively referred to as Rj where j is a variable for specifying a hue region, and j=1 to 4). FIG. 14 is a diagram illustrating a state of the achromatic region defined according to hue regions.

Note that based on information manually inputted by a user through the external I/F section 116 serving as hue dividing means, dividing axes for dividing the CrCb plane into a plurality of hue regions as shown in FIG. 14 are determined by the control section 115, and transferred to the coefficient calculation section 203.

In this case, the user manually inputs information related to the dividing axes for dividing the hue regions, but this is not restrictive. For example, an image pickup apparatus usually has various photographing modes (e.g., a program photographing mode and a night scene photographing mode), and dividing axes corresponding to such photographing modes may be set in advance. Then when the user specifies a photographing mode, the switchover to the dividing axis corresponding to the specified photographing mode may be performed automatically.

Then, by reading the constant terms of a predetermined function from the coefficient calculation function ROM 204, and performing a function operation, the coefficient calculation section 203 calculates, for each hue region Rj, the achromatic region defining coefficient "$radius_j$" according to the average amount of noise $AveN_j$ of the hue region Rj.

An achromatic region is defined as forming an isosceles triangle having two sides of the same length on two dividing axes positioned on both ends (see Expression 17 described later). In this case, the achromatic region defining coefficient "$radius_j$" calculated in the above manner represents the distance from the origin of the CrCb plane to the boundary between the achromatic region and the chromatic region in the angular direction that is half of the angle (central angular direction) formed by the dividing axes on both ends of the hue region Rj (e.g., see the achromatic region defining coefficient "$radius_1$" for the hue region R1 shown in FIG. 14).

Note that since the achromatic region of each hue region Rj is defined as forming an isosceles triangle, and an achromatic region defining coefficient "$radius_j$" is obtained for each of the plurality of hue regions Rj, if left as-is, the achromatic regions which are adjacent across a dividing axis may become discontinuous over the dividing axis (a boundary line separating the achromatic region and the chromatic region on the CrCb plane becomes discontinuous on the dividing axis). In this case, rounding the defined achromatic region around the dividing axis may be considered so that the continuity may be kept over the dividing axis. Alternatively, for example, connecting with a straight line the edge points at positions that are separated from the origin of the CrCb plane only by the achromatic region defining coefficient "$radius_j$" in the central angular direction of each hue region Rj, for use as a boundary line to separate the achromatic region and the chromatic region, may be considered. Alternatively, using an ellipse centered on the origin of the CrCb plane and passing through an edge point at a position separated from the origin of the CrCb plane by the achromatic region defining coefficient "$radius_j$" in the central angular direction of the hue region Rj, and through an edge point at a position separated from the origin of the CrCb plane by the achromatic region defining coefficient, "$radius_{j+1}$" in the central angular direction of the hue region R(j+1), and connecting the edge point of the hue region Rj and the edge point of the hur region R(j+1), an achromatic region may also be defined in the form of a plurality of ellipses connected at each edge point. Without being limited thereto, various types of means for keeping the continuity of a boundary line, which separates the achromatic region and the chromatic region on the CrCb plane, may be utilized, however, it is desired that the load of operation processing is light.

The coefficient calculation section 203 transfers the achromatic region defining coefficient "$radius_j$" of each hue region Rj calculated in this manner to the color conversion section 111.

Figure 15:
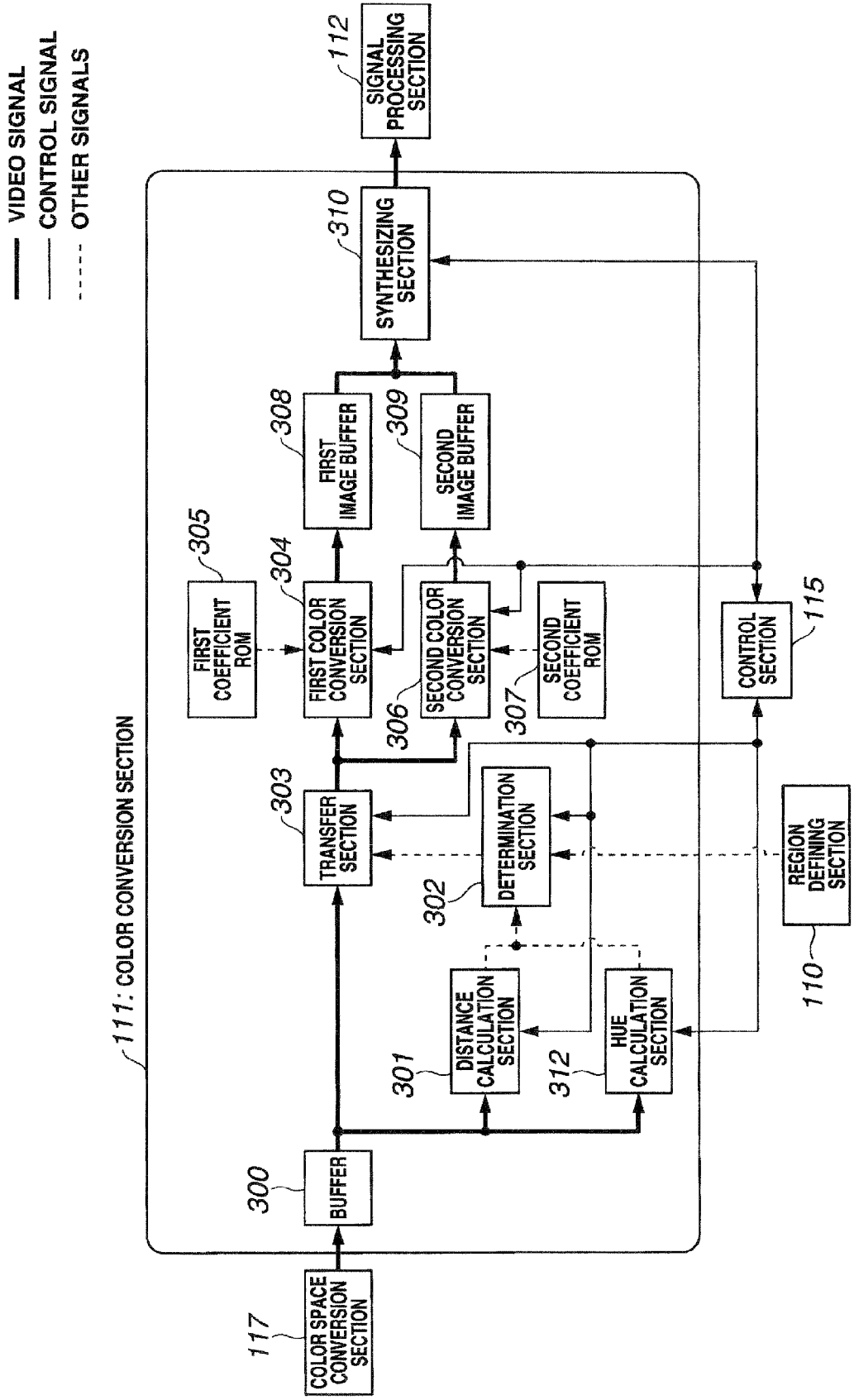
FIG. 15 is a block diagram illustrating an example of the configuration of a color conversion section according to the embodiment 2.

Next, FIG. 15 is a block diagram illustrating an example of the configuration of the color conversion section 111.

The color conversion section 111 has a configuration in which a hue calculation section 312 is added to the configuration of the color conversion section 111 shown in FIG. 8. Since other basic configuration is the same as that of the color conversion section 111 shown in FIG. 8, mainly, only different portions will be described.

The color space conversion section 117 is connected to the buffer 300. The buffer 300 is connected to the distance calculation section 301 and the transfer section 303, and also connected to the hue calculation section 312. The hue calculation section 312 is connected to the determination section 302. The control section 115 is also bidirectionally connected to and controls the hue calculation section 312.

The distance calculation section 301 reads the YCbCr signal stored on the buffer 300 on a pixel basis, and calculates the distance "dist" between a pixel of interest P on the YCrCb color space shown by a YCbCr signal (assuming that a coordinate on the YCrCb color space of the pixel of interest P is ($Y_p$, $Cr_p$, $Cb_p$)), and the Y-axis, which is the achromatic axis on the YCrCb color space, as shown in the following Expression 16.

$$\text{dist} = \sqrt{Cr_p^2 + Cb_p^2} \quad \text{[Expression 16]}$$

Then, the distance calculation section 301 transfers the calculated distance to the determination section 302.

Meanwhile, the hue calculation section 312 reads the YCbCr signal stored on the buffer 300 on a pixel basis, and calculates a hue signal H based on Expression 15 described above. The hue calculation section 312 transfers the calculated hue signal H to the determination section 302.

Based on the hue signal H of each pixel transferred from the hue calculation section 312, the determination section 302 determines a hue region to which a video signal of each pixel (pixel of interest P) belongs, and calculates the angular difference $θ_p$ between the central angle of the hue region Rj to which the pixel of interest P belongs (the hue region R1 in the example of FIG. 14) and the angle of the hue signal ($Cr_p$, $Cb_p$) of the pixel of interest P.

Next, the determination section 302 compares the achromatic region defining coefficient "$radius_j$" of the hue region Rj to which the video signal of the pixel of interest P belongs, which was obtained through the region defining section 110, with a value obtained by multiplying the distance "dist" transferred from the distance calculation section 301 by cos $θ_p$, and, according to the comparison result, outputs a flag signal "flag" indicating whether the pixel of interest P belongs to the achromatic region, as shown in the following Expression 17.

$$\text{flag} = \begin{cases} 1 & \{\text{when } radius_j \geq \text{dist} \cdot \cos θ_p\} \\ 0 & \{\text{when } radius_j < \text{dist} \cdot \cos θ_p\} \end{cases} \quad \text{[Expression 17]}$$

The determination section 302 transfers the flag signal "flag" outputted by such processing to the transfer section 303.

Subsequently, the same processing as that of the color conversion section 111 shown in FIG. 8 is performed so that different color conversion processing is performed on the YCbCr signal belonging to the achromatic region and the YCbCr signal belonging to the chromatic region.

According to the embodiment 2, almost similar effects to those of the embodiment 1 described above is achieved, besides, a color space is divided into a plurality of hue regions, the amount of noise is estimated for each hue region, and, based on the estimated amount of noise, an achromatic region can be adaptively defined for each hue region. Consequently, a low chroma color can be converted with higher precision, according to hue regions.

[Note]

According to the embodiments of the present invention described above in detail, the following configuration can be obtained.

[Note 1]

An image processing device according to the first invention, which performs color conversion processing on a video signal, includes region defining means for defining an achromatic region regarding a color space to which the video signal belongs, determination means for determining whether or not the video signal belongs to the achromatic region defined by the region defining means, and color conversion means for performing color conversion processing on the video signal according to a determination result by the determination means.

Corresponding Embodiments of the Invention and Preferred Application

The embodiments 1 and 2 correspond to the present invention. Region defining means corresponds to the region defining section 110 shown in FIGS. 1, 3, 11 and 13, determination means corresponds to determination section 302 shown in FIGS. 8, 9 and 15, and color conversion means corresponds to the color conversion section 111 shown in FIGS. 1, 8, 9, 11 and 15, respectively.

The preferred application of the present invention is an image processing device wherein based on a video signal obtained through the A/D conversion section 104, an achromatic region regarding a color space to which the video signal belongs is defined by the region defining section 110, whether or not the video signal belongs to the achromatic region is determined by the determination section 302, and, according to the determination result, color conversion processing is performed on the video signal by the color conversion section 111.

(Operation)

An achromatic regions is defined regarding a color space to which a video signal belongs, whether or not the video signal belongs to the defined achromatic region is determined, and, according to the determination result, color conversion processing is performed on the video signal.

(Advantage)

Color conversion processing is performed according to whether or not a video signal belongs to an achromatic region, thus high-precision color conversion processing can be performed, and high-quality video signals can be obtained.

Note that the present invention is not strictly limited to the above described embodiments, and components may be modified and embodied without departing from the spirit and scope thereof in the implementation stage. Further, a plurality of components disclosed in the embodiments may be combined as appropriate to make various inventions. For example, among all the components shown in the embodiments, some components may be removed, Moreover, the components across different embodiments may be combined as appropriate. As described above, it is natural that various modifications and applications are possible without departing from the spirit and scope of the present invention.

What is claimed is:

1. An image processing device for performing color conversion processing on a video signal, comprising:
noise amount estimation means for estimating an amount of noise of the video signal,
region defining means for defining an achromatic region regarding a color space to which the video signal belongs based on the amount of noise estimated by the noise amount estimation means;
determination means for determining whether or not the video signal belongs to the achromatic region defined by the region defining means;
and color conversion means for performing, according to a determination result by the determination means, color conversion processing on the video signal.

2. The image processing device according to claim 1, further comprising
color space conversion means for converting a video signal prior to conversion into a video signal for a predetermined color space, wherein
the region defining means defines an achromatic region regarding a color space to which the video signal, which has been converted by the color space conversion means, belongs, the determination means determines whether or not the video signal, which has been converted by the color space conversion means, belongs to the achromatic region defined by the region defining means, the color conversion means performs, according to a determination result by the determination means, color conversion processing on the video signal, which has been converted by the color space conversion means.

3. The image processing device according to claim 2, wherein the color space conversion means has as the predetermined color space any one among a YCbCr color space, a CIE-Lab color space and a CIE-Luv color space.

4. The image processing device according to claim 1, wherein the noise amount estimation means estimates the amount of noise of the video signal based on at least one of an ISO sensitivity and a white balance coefficient, which have already been set when the video signal was obtained.

5. The image processing device according to claim 1, wherein the region defining means defines the achromatic region as a region centered on an achromatic axis where saturation is 0 in the color space to which the video signal belongs.

6. The image processing device according to claim 5, wherein the region defining means comprises linear function means for calculating a region defining constant based on a liner function, and defines an achromatic region centered on the achromatic axis based on the region defining constant.

7. The image processing device according to claim 5, wherein the region defining means comprises nonlinear function means for calculating a region defining constant based on a nonliner function, and defines an achromatic region centered on the achromatic axis based on the region defining constant.

8. The image processing device according to claim 1, wherein
the region defining means further comprises hue dividing means for dividing a color space to which the video signal belongs into a plurality of hue regions and the achromatic region is defined for each of the plurality of hue regions divided by the hue dividing means based on the amount of noise obtained by the noise amount estimation means.

9. The image processing device according to claim 8, wherein
the determination means comprises:
hue region determination means for determining which of the plurality of hue regions divided by the hue dividing means the video signal belongs to, based on the hue information of the video signal; and
comparison/discrimination means for discriminating whether or not the video signal belongs to an achromatic region for the hue region, which the video signal was determined to belong to by the hue region determination means, among the achromatic regions defined by the region defining means for each of the plurality of hue regions.

10. The image processing device according to claim 1, wherein the color conversion means comprises linear conversion means for performing the color conversion processing by a linear conversion.

11. The image processing device according to claim 1, wherein
the color conversion means comprises:
a first color conversion section for performing first color conversion processing; and a second color conversion section for performing second color conversion processing different from the first color conversion processing, and
performs color conversion processing such that the first color conversion section performs the first color conversion processing on a video signal determined not to belong to the achromatic region by the determination means, and the second color conversion section performs the second color conversion processing on a video signal determined to belong to the achromatic region by the determination means.

12. The image processing device according to claim 11, wherein the first color conversion section performs, as the first color conversion processing, processing so as not to change the video signal.

13. The image processing device according to claim 11, wherein the first color conversion section performs, as the first color conversion processing, projection of the video signal onto the achromatic axis where saturation in the color space to which the video signal belongs is 0.

14. The image processing device according to claim 11, wherein, so as not to produce a discontinuity in the processing result by the first color conversion section and the processing result by the second color conversion section, the color conversion means performs, as the second color conversion processing by the second color conversion section, the second color conversion processing, which has been corrected by weighting addition of the first color conversion processing and the second color conversion processing.

15. The image processing device according to claim 14, wherein the color conversion means uses a weighting factor according to the distance between the video signal and any reference point to carry out the weighting addition.

16. The image processing device according to claim 1, wherein
the color conversion means comprises:
a color conversion table for recording a relationship between the video signal and a video signal after the color conversion processing, and
table operation means for obtaining the video signal after color conversion processing by making reference to the color conversion table based on the video signal.

17. An image processing program stored on a non-transitory computer readable medium for causing a computer to perform color conversion processing on a video signal, comprising:
a noise amount estimation step of estimating an amount of noise of the video signal,
a region defining step of defining an achromatic region regarding a color space to which the video signal belongs based on the amount of noise estimated in the noise amount estimation step;
a determination step of determining whether or not the video signal belongs to the achromatic region defined in the region defining step;
and a color conversion step of performing, according to a determination result in the determination step, color conversion processing on the video signal.

18. The image processing program according to claim 17 further causing a computer to perform a color conversion step of converting a video signal prior to conversion into a video signal for a predetermined color space, wherein
the region defining step defines an achromatic region regarding a color space to which the video signal, which has been converted in the color space conversion step, belongs, the determination step determines whether or not the video signal, which has been converted in the color space conversion step, belongs to the achromatic regions defined in the region defining step.

the color conversion step performs, according to a determination result of the determination step, color conversion processing on the video signal, which has been converted in the color space conversion step.

19. An image processing method for performing color conversion processing on a video signal, comprising:

a noise amount estimation step of estimating an amount of noise of the video signal, a region defining step of defining an achromatic region regarding a color space to which the video signal belongs based on the amount of noise estimated in the noise amount estimation step;

a determination step of determining whether or not the video signal belongs to the achromatic region defined in the region defining step;

and a color conversion step of performing, according to a determination result in the determination step, color conversion processing on the video signal.

20. The image processing method according to claim 19, further comprising color space conversion step for converting a video signal prior to conversion into a video signal for a predetermined color space, wherein the region defining step defines an achromatic region regarding a color space to which the video signal, which has been converted in the color space conversion step, belongs, the determination step determines whether or not the video signal, which has been converted in the color space conversion step, belongs to the achromatic regions defined in the region defining step, the color conversion step performs, according to a determination result of the determination step, color conversion processing on the video signal, which has been converted in the color space conversion step.

* * * * *